(12) United States Patent
He

(10) Patent No.: US 8,056,284 B2
(45) Date of Patent: Nov. 15, 2011

(54) AUTO-IRRIGATING CASE

(76) Inventor: Wen Hua He, Zhongshan (CN)

( * ) Notice: Subject to any disclaimer, the term of this patent is extended or adjusted under 35 U.S.C. 154(b) by 150 days.

(21) Appl. No.: 12/690,333

(22) Filed: Jan. 20, 2010

(65) Prior Publication Data

US 2011/0173884 A1 Jul. 21, 2011

(51) Int. Cl.
*A01G 31/02* (2006.01)
(52) U.S. Cl. ............................... 47/79; 47/63
(58) Field of Classification Search ............... 47/79, 63, 47/82, 59 R, 62 R, 62 A, 62 C, 48.5, 66.7
See application file for complete search history.

(56) References Cited

U.S. PATENT DOCUMENTS

| | | | |
|---|---|---|---|
| 3,758,986 A | 9/1973 | Roberts | |
| 3,758,987 A | 9/1973 | Crane, Jr. | |
| 3,992,809 A * | 11/1976 | Chew | 47/62 R |
| 7,426,802 B2 * | 9/2008 | Umbaugh, Jr. | 47/62 R |
| 2001/0047617 A1 * | 12/2001 | Blossom | 47/62 R |
| 2008/0072492 A1 * | 3/2008 | Olson | 47/79 |
| 2010/0064581 A1 * | 3/2010 | Johnson | 47/79 |
| 2010/0139161 A1 * | 6/2010 | Porter | 47/66.7 |

OTHER PUBLICATIONS

Homegrown Evolution, Self Irrigating Planter Resources, internet article, Apr. 5, 2009.

* cited by examiner

*Primary Examiner* — Rob Swiatek
*Assistant Examiner* — Kristen Hayes
(74) *Attorney, Agent, or Firm* — Garlitz Bell, L.L.P.; Corby Bell

(57) ABSTRACT

An auto-irrigation apparatus is provided. A control panel and a water-level indicator light are inserted in a side of an irrigating case. A water pump, a cell box, and a control circuit are inserted in the irrigating case. The control panel, water-level indicator light, cell box, and water pump are coupled to the control circuit. A solar panel is embedded in each of two cover panels. Each of the two cover panels are mounted on opposite sides of the irrigating case. The embedded solar panels are coupled to the cell box. A water conduit adapter is connected to an outlet of the water pump. A planter box is placed in the irrigating case above a built-in water reservoir so that the water conduit adapter passes through an aperture in the planter box. Then, the water conduit adapter is connected to a spray pipe positioned above the planter box.

20 Claims, 5 Drawing Sheets

AUTO-IRRIGATING CASE

BACKGROUND

1. Field

The disclosure relates generally to an improved auto-irrigating apparatus and more specifically to an auto-irrigating case that includes a submersible water pump and solar panels for automatically providing water to plants in a planter box.

2. Description of the Related Art

It is well-known that people enjoy looking at plants because they find it very soothing and relaxing. Consequently, many cities provide arboretums, botanical gardens, nature preserves, and parks where a wide variety of plants are grown for the public's viewing enjoyment. Also, many people enjoy planting and growing their own flowers and plants as a hobby.

Flowers and plants in order to grow and flourish require adequate amounts of water. Providing too little or sporadic watering impedes the growth process or may cause the plants to wither and die. Further, it is time consuming for plant owners to manually supply the necessary water.

In addition, many people do not have a plot of land in which to grow plants because they live in an apartment or an urban setting. As a result, an increasing number of urban agriculturists use self-irrigating planters (SIPs) or self-watering planters as a plant growing tool. SIPs automatically provide water to plants.

SUMMARY

According to one embodiment of the present invention, an auto-irrigation apparatus is assembled. A control panel and a water-level indicator light are inserted in a side of an irrigating case. A water pump, a cell box, and a control circuit are inserted in the irrigating case. The control panel and the water-level indicator light are coupled to the control circuit. In addition, the control circuit is coupled to the cell box and water pump. A solar panel is embedded in each of two cover panels. Each of the two cover panels are mounted on a top portion of two opposite sides of the irrigating case using a pin. The embedded solar panels are coupled to the cell box. A first end of a water conduit adapter is connected to an outlet of the water pump. A planter box is placed in the irrigating case above a built-in water reservoir so that the water conduit adapter passes through an aperture in the planter box. Then, a second end of the water conduit adapter is connected to a spray pipe positioned above the planter box.

DETAILED DESCRIPTION

In the following detailed description of illustrative embodiments of the present invention, reference is made to the accompanying drawings that form a part hereof, and in which is shown by way of illustration specific illustrative embodiments in which the present invention may be practiced. These illustrative embodiments are described in sufficient detail to enable those skilled in the art to practice the present invention, and it is understood that other embodiments may be utilized and that logical mechanical and electrical changes may be made without departing from the scope and spirit of the present invention. To avoid detail not necessary to enable those skilled in the art to practice the present invention, the detailed description may omit certain information known to those skilled in the art. The following detailed description is, therefore, not to be taken in a limiting sense, and the scope of the present invention is defined only by the appended claims.

With reference now to the figures, and in particular, with reference to FIGS. 1-4, exemplary diagrams of environments are provided in which illustrative embodiments may be implemented. It should be appreciated that FIGS. 1-4 are only exemplary and are not intended to assert or imply any limitation with regard to the environments in which different embodiments may be implemented. Many modifications to the depicted environments may be made.

Figure 1:
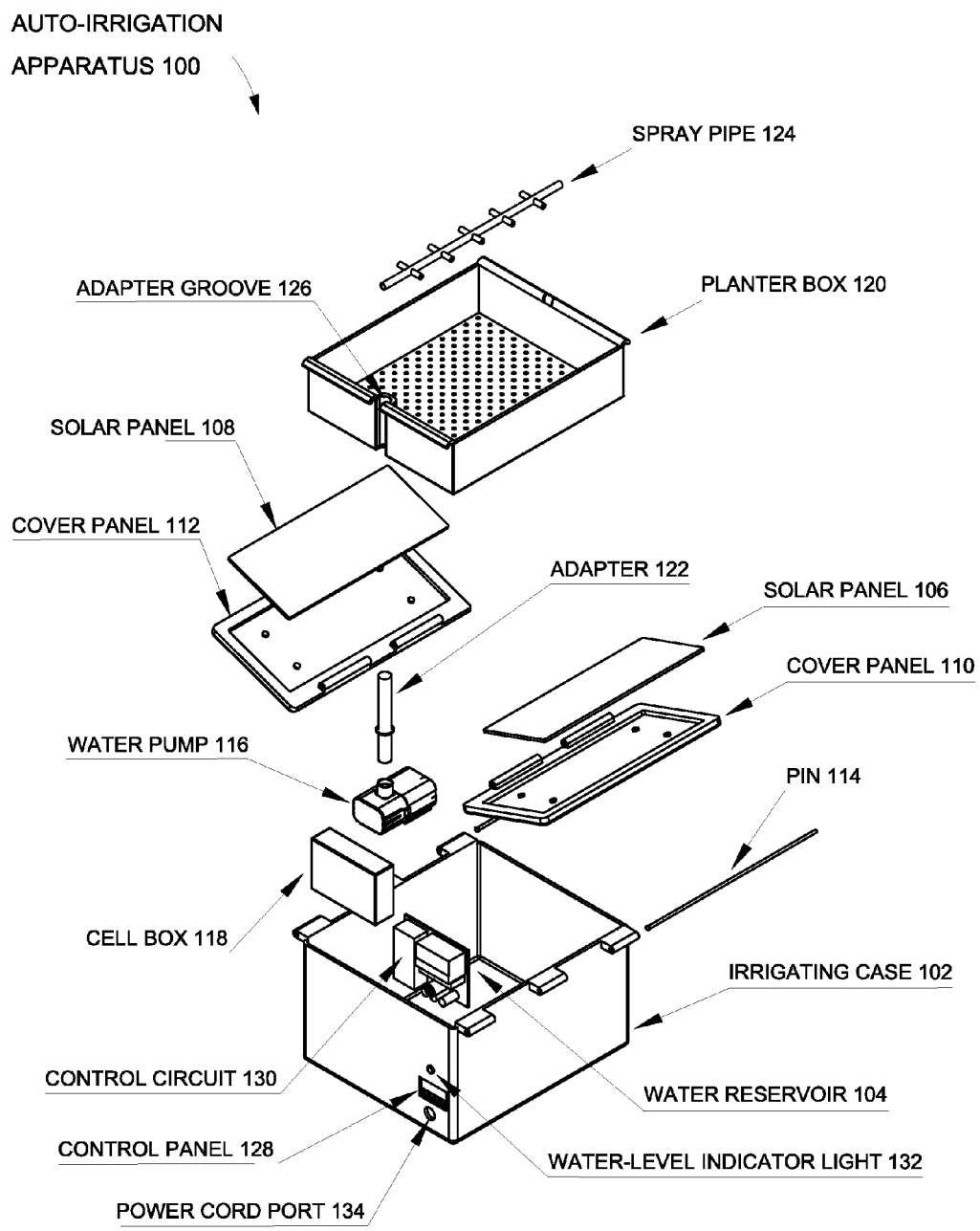
FIG. 1 is a pictorial representation of an exploded perspective view of an auto-irrigation apparatus in accordance with an illustrative embodiment.

FIG. 1 is a pictorial representation of an exploded perspective view of an auto-irrigation apparatus in accordance with an illustrative embodiment. Auto-irrigation apparatus 100 is an assembly of components that a user utilizes to automatically provide water to plants. Auto-irrigation apparatus 100 may automatically provide water to the plants based, for example, on time settings input by a user according to the plants' needs, growing stages and habits, and growing seasons. Alternatively, auto-irrigation apparatus 100 may provide water to the plants on a default predetermined time interval basis. In addition, the user may manually activate auto-irrigation apparatus 100 to provide water to the plants as desired.

Auto-irrigation apparatus 100 includes irrigating case 102, which has a built-in water reservoir, such as water reservoir 104. This reservoir may contain enough water to irrigate the plants for several days or weeks depending upon the plants' needs and the size of water reservoir 104. As a result, the user is not required to continually remember to water the plants or engage in the time consuming activity of manually carrying the necessary water to the plants. Irrigation case 102 may, for example, be made of acrylonitrile butadiene styrene (ABS) plastic, which is a common thermoplastic used to make light, rigid, molded products, such as piping.

In addition, auto-irrigation apparatus 100 includes solar panels 106 and 108. Solar panels 106 and 108 when exposed to sunlight, convert the sunlight directly into electricity by the photovoltaic effect. Solar panels 106 and 108 may, for example, be polyethylene terephthalate (PET) laminate solar panels made of monocrystalline or polycrystalline silicone, which may be designed into different shapes with different power outputs. The encapsulation materials may be made of special PET resins.

Solar panels 106 and 108 are embedded in cover panels 110 and 112, respectively, with, for example, glass cement to protect solar panels 106 and 108 from moisture. Cover panels 110 and 112 may be made of ABS plastic as well. Further, cover panels 110 and 112 are mechanically connected or hinged to irrigating case 102 using pin 114. Pin 114 allows the user to fold and unfold cover panels 110 and 112 as needed. In addition, pin 114 allows the user to individually position cover panels 110 and 112 within a 270 degree arch for obtaining maximal sunlight exposure to solar panels 106 and 108, for mere convenience when space is limited around auto-irrigation case 100, or for storage purposes.

Solar panels 106 and 108 provide electrical power to water pump 116 via cell box 118. In other words, solar panels 106 and 108 are electrically coupled to cell box 118 and cell box 118 is electrically coupled to water pump 116. Water pump 116 is an electrically driven low-voltage pump, which requires either a manual activation by the user or a separate timer device to automatically activate water pump 116 during the desired times of operation. In addition, water pump 116 is a device that is capable of operating in a submerged aqueous environment and includes an electric motor to drive an impeller to move water out through a water outlet.

Water pump 116 pumps the water from water reservoir 104 to the plants in planter box 120 via adapter 122 and spray pipe 124. Planter box 120 is a container for holding fertilized soil, which provides the proper environment for growing plants. Planter box 120 includes a perforated soil barrier in the bottom of planter box 120 for recycling excess water back to water reservoir 104 to save on water usage and to minimize nutrient loss, which may enhance plant growth.

Adapter 122 is mechanically connected to water pump 116 and spay pipe 124. Adapter 122 is a hollow conduit used for transporting water from the outlet of water pump 116 to spay pipe 124, which is positioned above planter box 120 to create a water irrigation system. Adapter 122 passes through planter box 120 via an aperture located at an edge of planter box 120, such as adapter groove 126. However, it should be noted that the aperture for accommodating adapter 122 may be located anywhere in or around planter box 120. Also, it should be noted that the user may easily remove planter box 120 from irrigating case 102 as needed.

Spray pipe 124 is a pipe that extends from one side of planter box 120 to the opposite side. In addition, spray pipe 124 includes a plurality of smaller pipes or openings along its length to provide for the even distribution of water over the plants planted in planter box 120. Spray pipe 124 may, for example, be made of ABS plastic as well or may be made of polypropylene (PP) plastic, which is a thermoplastic polymer used in a wide variety of applications, such as plastic parts and reusable containers.

Auto-irrigation apparatus 100 uses cell box 118 for electrical power storage and for electrical power output. Cell box 118 includes one or more battery cells that are rechargeable. The one or more rechargeable battery cells may, for example, be made of nickel-metal hydride (Ni-MH). Cell box 118 stores the electrical output of solar panels 106 and 108 during periods of adequate sunlight.

During periods of adequate sunlight or when the output voltage of solar panels 106 and 108 is higher than the battery cell voltage in cell box 118, solar panels 106 and 108 supply the electrical power to water pump 116, as well as provide electrical charging to the one or more rechargeable battery cells contained within cell box 118. However, during periods of poor sunlight or when the output voltage of solar panels 106 and 108 is lower than the battery cell voltage in cell box 118, cell box 118 supplies the electrical power to water pump 116 for its functioning. The power output of cell box 118 is controlled by control panel 128 and control circuit 130, which are all electrically coupled to one another.

Control panel 128 is located on one side of irrigating case 102 and includes a power on/off device. In addition, control panel 128 includes a device that is capable of receiving user inputs for setting when and for how long water pump 116 is to water the plants in planter box 120. These user inputs are transmitted to and stored on control circuit 130 for execution.

Control circuit 130 is an integrated circuit, which is customized for its particular use in auto-irrigation apparatus 100. Control circuit 130 may, for example, be an application-specific integrated circuit (ASIC). Further, control circuit 130 may include one or more processors and one or more storage devices, such as read only memory (ROM), random access memory (RAM), and flash memory.

Moreover, control circuit 130 is capable of detecting a low water level entering water pump 116. Upon detecting the low water level, control circuit 130 shuts off the motor's power supply to minimize damage to water pump 116. Furthermore, upon detecting that the low water level condition no longer exists, control circuit 130 allows the motor in water pump 116 to run again. Thus, control circuit 130 controls the running of water pump 116's motor by determining when and when not to run the motor. As a result, control circuit 130 determines when and for how long to water the plants in planter box 120.

In addition, control circuit 130 uses water-level indicator light 132 to indicate to the user that a low water level condition exists and that water needs to be added to water reservoir 104. During these periods of low water levels, water-level indicator light 132 may, for example, flash on and off. Alternatively, water-level indicator light 132 may remain on continuously during periods of low water levels. Water-level indicator light 132 may, for example, be a light-emitting diode (LED). Also, even though water-level indicator light 132 is illustrated as being a separate device, water-level indicator light 132 may be included on control panel 128. Further, even though control circuit 130 and water-level indicator light 132 are illustrated as being a located on a side of irrigating case 102, control circuit 130 and water-level indicator light 132 may be located elsewhere on irrigating case 102, such as, for example, on a portion of cover panel 110 or cover panel 112.

Also, it should be noted that cell box 118 and control circuit 130 are located in water reservoir 104 adjacent to water pump 116. Consequently, cell box 118 and control circuit 130 are injected with a water-proofing substance, such as epoxy, as a sealant. In addition, it should be noted that irrigation case 102 includes power cord port 134. Power cord port 134 is an aperture in a side of irrigation case 102 for accommodating a plug-in power cord, which provides "normal electrical power" to water pump 116 when auto-irrigation apparatus 100 is placed in a location where no sunlight is available to solar panels 106 and 108. The plug-in power cord is connected to a transformer to step down the voltage to accommodate the low voltage requirements of water pump 116.

Figure 2:
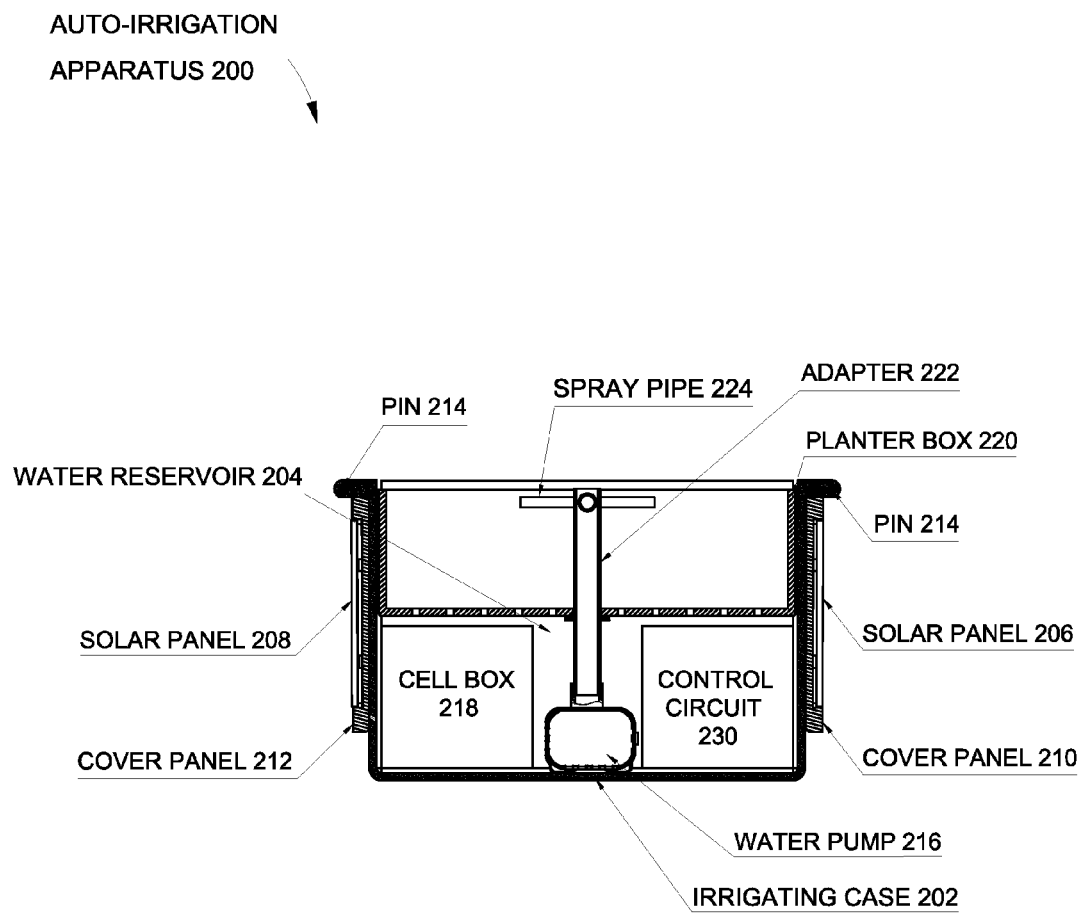
FIG. 2 is a pictorial representation of a side sectional view of an assembled auto-irrigation apparatus in accordance with an illustrative embodiment.

With reference now to FIG. 2, a pictorial representation of a side sectional view of an assembled auto-irrigation apparatus is depicted in accordance with an illustrative embodiment. Auto-irrigation apparatus 200 may, for example, be auto-irrigation apparatus 100 in FIG. 1. Auto-irrigation apparatus 200 includes irrigating case 202, water reservoir 204, solar panels 206 and 208, cover panels 210 and 212, pin 214, water pump 216, cell box 218, planter box 220, adapter 222, spray pipe 224, and control circuit 230, such as irrigating case 102, water reservoir 104, solar panels 106 and 108, cover panels 110 and 112, pin 114, water pump 116, cell box 118, planter box 120, adapter 122, spray pipe 124, and control circuit 130 in FIG. 1.

Figure 3:
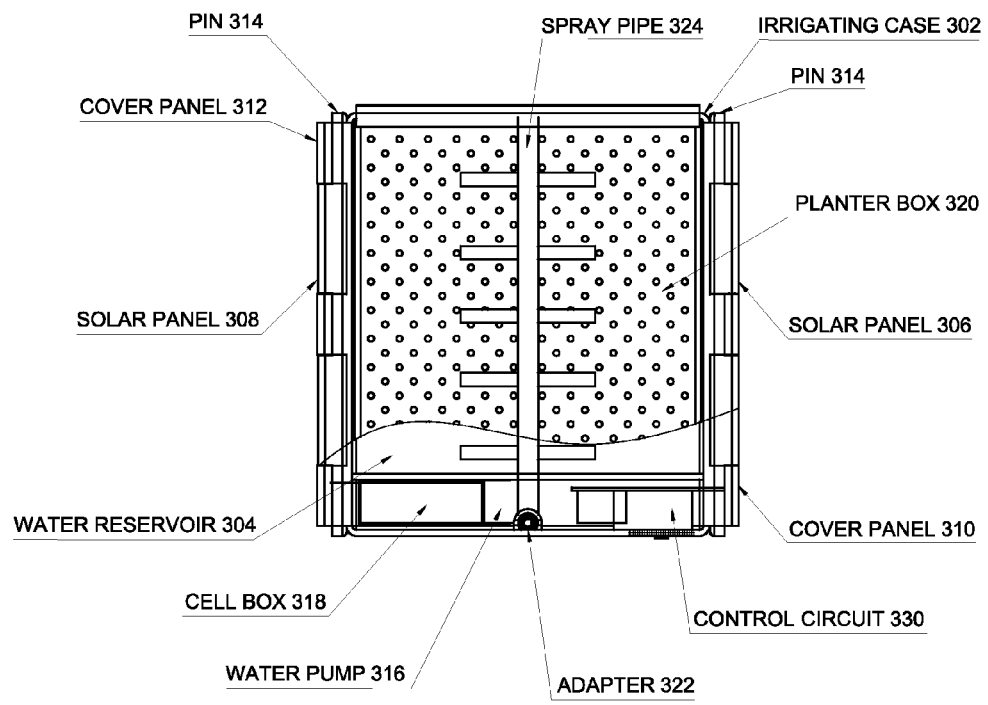
FIG. 3 is a pictorial representation of a top perspective view of an assembled auto-irrigation apparatus in accordance with an illustrative embodiment.

With reference now to FIG. 3, a pictorial representation of a top perspective view of an assembled auto-irrigation apparatus is depicted in accordance with an illustrative embodiment. Auto-irrigation apparatus 300 may, for example, be auto-irrigation apparatus 100 in FIG. 1. Auto-irrigation apparatus 300 includes irrigating case 302, water reservoir 304, solar panels 306 and 308, cover panels 310 and 312, pin 314, water pump 316, cell box 318, planter box 320, adapter 322, spray pipe 324, and control circuit 330, such as irrigating case 102, water reservoir 104, solar panels 106 and 108, cover panels 110 and 112, pin 114, water pump 116, cell box 118, planter box 120, adapter 122, spray pipe 124, and control circuit 130 in FIG. 1.

Figure 4:
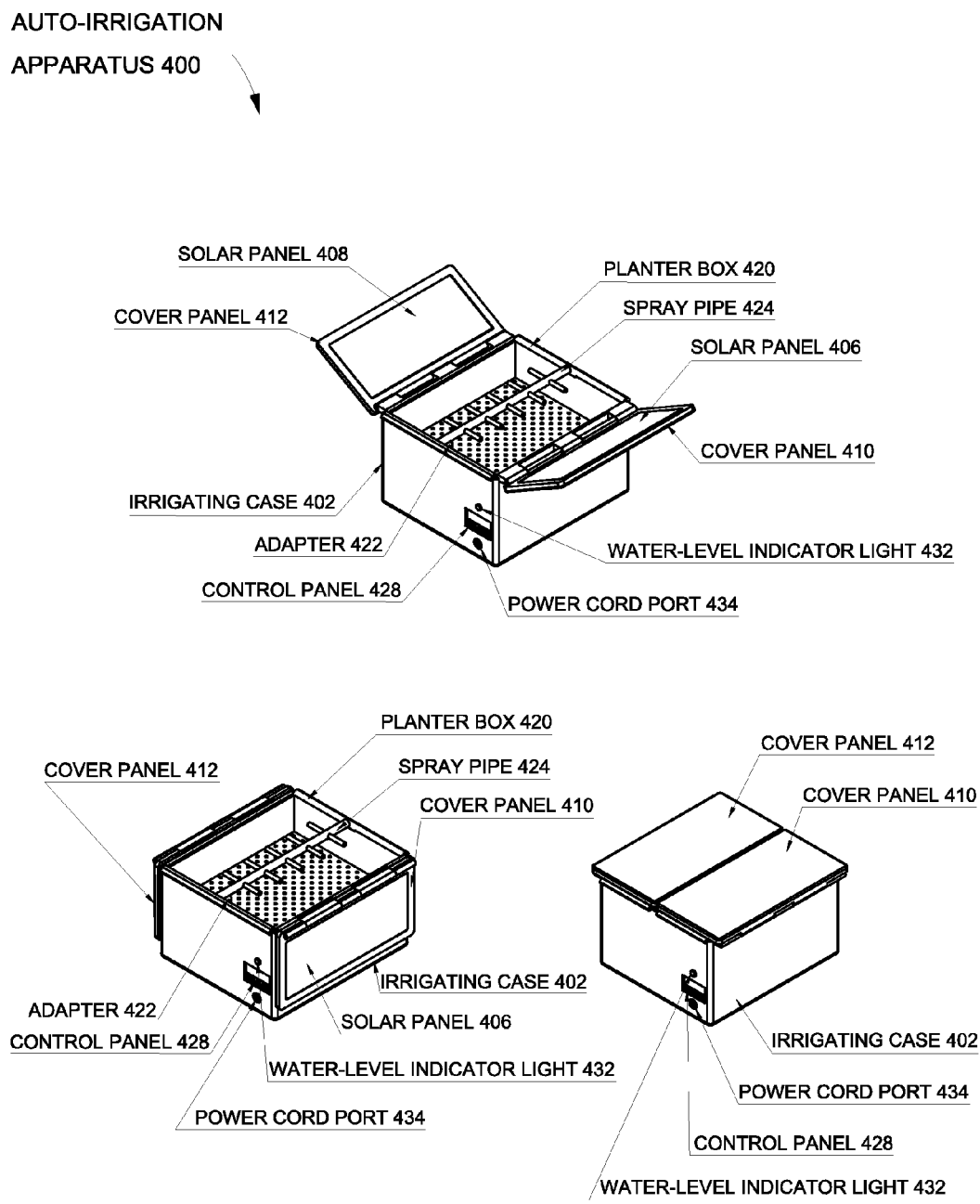
FIG. 4 is a pictorial representation of several oblique perspective views of an assembled auto-irrigation apparatus in accordance with an illustrative embodiment.

With reference now to FIG. 4, a pictorial representation of several oblique perspective views of an assembled auto-irrigation apparatus is depicted in accordance with an illustrative embodiment. Auto-irrigation apparatus 400 may, for example, be auto-irrigation apparatus 100 in FIG. 1. Auto-irrigation apparatus 400 includes irrigating case 402, solar panels 406 and 408, cover panels 410 and 412, planter box 420, adapter 422, spray pipe 424, control panel 428, water-level indicator light 432, and power cord port 434, such as irrigating case 102, solar panels 106 and 108, cover panels 110 and 112, planter box 120, adapter 122, spray pipe 124, control panel 128, water-level indicator light 132, and power cord port 134 in FIG. 1.

Figure 5:
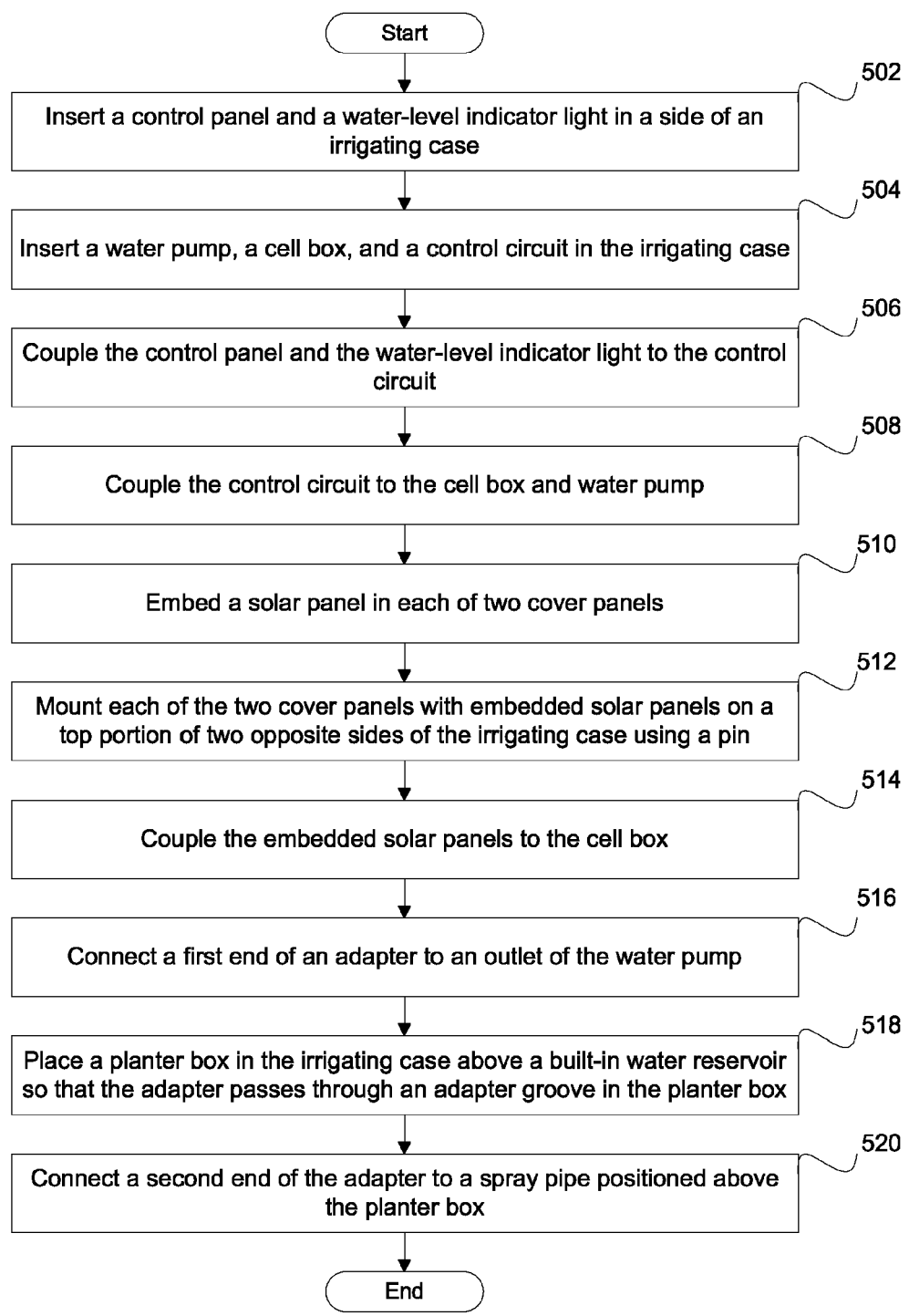
FIG. 5 is a flowchart illustrating an exemplary process for assembling an auto-irrigation apparatus in accordance with an illustrative embodiment.

With reference now to FIG. 5, a flowchart illustrating an exemplary process for assembling an auto-irrigation apparatus is shown in accordance with an illustrative embodiment. The auto-irrigation apparatus may, for example, be auto-irrigation apparatus 100 in FIG. 1.

The process begins when an assembler inserts a control panel and a water-level indicator light, such as control panel 128 and water-lever indicator light 132 in FIG. 1, in a side of an irrigating case, such as irrigating case 102 in FIG. 1 (step 502). In addition, the assembler inserts a water pump, a cell box, and a control circuit, such as water pump 116, cell box 118, and control circuit 130 in FIG. 1, in the irrigating case (step 504). Afterward, the assembler electrically couples the control panel and the water-level indicator light to the control circuit (step 506). Further, the assembler electrically couples the control circuit to the cell box and the water pump (step 508).

Subsequently, the assembler embeds a solar panel in each of two cover panels, such as solar panels 406 and 408 embedded in cover panels 410 and 412, respectively, in FIG. 4 (step 510). Then, the assembler mounts each of the two cover panels with an embedded solar panel on a top portion of two opposite sides of the irrigating case using a pin, such as pin 114 in FIG. 1 (step 512). Afterward, the assembler electrically couples the embedded solar panels to the cell box (step 514).

Subsequently, the assembler mechanically connects one end of a water conduit adapter to an outlet of the water pump (step 516). Then, the assembler places a planter box, such as planter box 120 in FIG. 1, above a built-in water reservoir, such as water reservoir 104 in FIG. 1, so that the water conduit adapter passes through an aperture or an adapter groove in the planter box, such as adapter groove 126 in FIG. 1 (step 518). Afterward, the assembler mechanically connects the other end of the water conduit adapter to a spay pipe, such as spray pipe 124 in FIG. 1, positioned above the planter box (step 520).

The process terminates thereafter. However, it should be noted that the assembler may perform the steps above in any order and may perform two or more steps concurrently. Also, it should be noted that the assembler may add additional parts and components to the auto-irrigation apparatus at any time during the assembly process.

Thus, illustrative embodiments provide a method and apparatus for an improved auto-irrigating case that includes a submersible water pump and solar panels for automatically providing water to plants in a planter box. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for assembling an auto-irrigation apparatus, the method comprising:
   inserting a control panel and a water-level indicator light in a side of an irrigating case;
   inserting a water pump, a cell box, and a control circuit in the irrigating case;
   coupling the control panel and the water-level indicator light to the control circuit;
   coupling the control circuit to the cell box and water pump;
   embedding a solar panel in each of two cover panels;
   mounting each of the two cover panels on a top portion of two opposite sides of the irrigating case using pins;
   coupling the embedded solar panels to the cell box;
   connecting a first end of a water conduit adapter to an outlet of the water pump;
   placing a planter box in the irrigating case above a built-in water reservoir so that the water conduit adapter passes through an aperture in the planter box; and
   connecting a second end of the water conduit adapter to a spray pipe positioned above the planter box.

2. The method of claim 1, wherein the cell box includes one or more rechargeable battery cells for electrical power storage and for electrical power output, and wherein the cell box supplies electrical power to the water pump during periods of poor sunlight and when an output voltage of the embedded solar panels is lower than a battery cell voltage in the cell box, and wherein the embedded solar panels supply the electrical power to the water pump and charge the one or more rechargeable battery cells during periods of adequate sunlight and when the output voltage of the embedded solar panels is higher than the battery cell voltage in cell box.

3. The method of claim 1, wherein each of the two cover panels are individually foldable around the pins to allow individual positioning of each of the two cover panels for obtaining maximal sunlight exposure to the embedded solar panels.

4. The method of claim 1, wherein the planter box includes a perforated soil barrier to allow excess water to recycle to the built-in water reservoir in the irrigating case.

5. The method of claim 1, wherein the spray pipe extends from one side of the planter box to an opposite side of the planter box, and wherein the spray pipe includes a plurality of openings along its length to evenly distribute water over the planter box.

6. The method of claim 1, wherein the control circuit determines when and when not to run the water pump.

7. The method of claim 1, wherein the control circuit is capable of detecting a low water level entering the water pump.

8. The method of claim 7, wherein the control circuit stops the water pump from running in response to detecting the low water level entering the water pump, and wherein the control circuit allows the water pump to run again in response to detecting that the low water level no longer exists.

9. The method of claim 7, wherein the control circuit uses the water-level indicator light to indicate that the low water level exists.

10. The method of claim 1, wherein the control panel is capable of receiving user input for setting when and for how long to run the water pump.

11. An auto-irrigating apparatus, comprising:
an irrigating case that includes a built-in water reservoir;
a control panel and a water-level indicator light that are inserted into a side of the irrigating case;
a water pump, a cell box, and a control circuit that are inserted within the built-in water reservoir, wherein the control circuit is electrically coupled to the control panel, the water-level indicator light, the water pump, and the cell box;
two cover panels that are mounted on a top portion of two opposite sides of the irrigating case using pins, wherein each of the two cover panels are embedded with a solar panel, and wherein the embedded solar panels are electrically coupled to the cell box;
a planter box that is placed in the irrigating case above the built-in water reservoir; and
a water conduit adapter that is mechanically connected to an outlet of the water pump and a spray pipe positioned above the planter box, wherein the water conduit adapter passes through an aperture in the planter box.

12. The auto-irrigating apparatus of claim 11, wherein the cell box includes one or more rechargeable battery cells for electrical power storage and for electrical power output, and wherein the cell box supplies electrical power to the water pump during periods of poor sunlight and when an output voltage of the embedded solar panels is lower than a battery cell voltage in the cell box, and wherein the embedded solar panels supply the electrical power to the water pump and charge the one or more rechargeable battery cells during periods of adequate sunlight and when the output voltage of the embedded solar panels is higher than the battery cell voltage in cell box.

13. The auto-irrigating apparatus of claim 11, wherein each of the two cover panels are individually foldable around the pins to allow individual positioning of each of the two cover panels for obtaining maximal sunlight exposure to the embedded solar panels.

14. The auto-irrigating apparatus of claim 11, wherein the planter box includes a perforated soil barrier to allow excess water to recycle to the built-in water reservoir in the irrigating case.

15. The auto-irrigating apparatus of claim 11, wherein the spray pipe extends from one side of the planter box to an opposite side of the planter box, and wherein the spray pipe includes a plurality of openings along its length to evenly distribute water over the planter box.

16. The auto-irrigating apparatus of claim 11, wherein the control circuit determines when and when not to run the water pump.

17. The auto-irrigating apparatus of claim 11, wherein the control circuit is capable of detecting a low water level entering the water pump.

18. The auto-irrigating apparatus of claim 17, wherein the control circuit stops the water pump from running in response to detecting the low water level entering the water pump, and wherein the control circuit allows the water pump to run again in response to detecting that the low water level no longer exists.

19. The auto-irrigating apparatus of claim 17, wherein the control circuit uses the water-level indicator light to indicate that the low water level exists.

20. The auto-irrigating apparatus of claim 11, wherein the control panel is capable of receiving user input for setting when and for how long to run the water pump.

* * * * *